United States Patent
Hashim et al.

(10) Patent No.: US 9,915,239 B2
(45) Date of Patent: Mar. 13, 2018

(54) VEHICLE START-STOP SYSTEM

(71) Applicant: Ford Global Technologies, LLC, Dearborn, MI (US)

(72) Inventors: Hasdi R. Hashim, Ann Arbor, MI (US); Arnold Kweku Mensah-Brown, Canton, MI (US); Bruce Carvell Blakemore, Plymouth, MI (US); Mark Douglas Malone, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 24 days.

(21) Appl. No.: 15/076,772

(22) Filed: Mar. 22, 2016

(65) Prior Publication Data
US 2017/0276113 A1    Sep. 28, 2017

(51) Int. Cl.
| | |
|---|---|
| F02N 11/08 | (2006.01) |
| H02P 9/00 | (2006.01) |
| F02N 11/12 | (2006.01) |
| F02N 11/14 | (2006.01) |

(52) U.S. Cl.
CPC ........ *F02N 11/0866* (2013.01); *F02N 11/087* (2013.01); *F02N 11/0814* (2013.01); *F02N 11/12* (2013.01); *F02N 11/14* (2013.01); *F02N 2011/0877* (2013.01); *F02N 2200/061* (2013.01)

(58) Field of Classification Search
CPC ............ F02N 11/0866; F02N 11/0814; F02N 11/087; F02N 11/0862; F02D 2011/0885; F02D 2011/0877; F02D 2011/0888; H02P 9/00; H02J 7/14

USPC ........................................................ 290/38 R
See application file for complete search history.

(56) References Cited

U.S. PATENT DOCUMENTS

| | | |
|---|---|---|
| 5,155,374 A | 10/1992 | Shirata et al. |
| 5,642,696 A | 7/1997 | Matsui |
| 7,806,095 B2 | 10/2010 | Cook et al. |

(Continued)

FOREIGN PATENT DOCUMENTS

| | | |
|---|---|---|
| CN | 102910061 | 2/2013 |
| FR | 2832464 A1 | 5/2003 |

(Continued)

OTHER PUBLICATIONS

Maher, Bobby, Ultracapacitors and the Hybrid Electric Vehicle, Maxwell Technologies, Inc., Feb. 1, 2005.

(Continued)

*Primary Examiner* — Lindsay Low
*Assistant Examiner* — George Jin
(74) *Attorney, Agent, or Firm* — Frank A. MacKenzie; Bejin Bineman PLC

(57) ABSTRACT

A vehicle starter assembly includes a switching circuit configured to operate in a charging state and a discharging state, and a first energy storage device and a second energy storage device electrically connected to the switching circuit. The first energy storage device and the second energy storage device are connected in parallel to one another in the charging state and in series with one another in the discharging state. The processor is programmed to detect an engine start request and output a switch control signal that toggles the switching circuit between the charging state and the discharging state to start an internal combustion engine of a host vehicle.

16 Claims, 7 Drawing Sheets

(56) References Cited

U.S. PATENT DOCUMENTS

| | | | |
|---|---|---|---|
| 8,190,350 B2* | 5/2012 | Kortschak | B60K 6/485 701/105 |
| 9,174,525 B2 | 11/2015 | Caron | |
| 2002/0152981 A1 | 10/2002 | Goetze et al. | |
| 2002/0167297 A1* | 11/2002 | Nozu | F02N 11/0862 320/166 |
| 2010/0244459 A1* | 9/2010 | Gibson | F02N 11/0866 290/38 R |
| 2011/0309675 A1* | 12/2011 | Eger | B60K 6/30 307/10.6 |
| 2012/0237799 A1* | 9/2012 | Jiang | H01M 2/1072 429/7 |
| 2012/0330538 A1* | 12/2012 | Spjuth | F02N 11/0866 701/113 |
| 2015/0134231 A1* | 5/2015 | Li | F02N 11/0814 701/112 |
| 2015/0300307 A1* | 10/2015 | Setterberg | F02N 11/087 701/113 |
| 2015/0377203 A1 | 12/2015 | Neet | |

FOREIGN PATENT DOCUMENTS

| | | |
|---|---|---|
| JP | 2014231291 | 12/2014 |
| WO | WO 2014205508 A1 | 12/2014 |

OTHER PUBLICATIONS

First one up the drive, The Economist, Jul. 12, 2014.
Thounthong, Phatiphat, Energy management of fuel cell/battery/supercapacitor hybrid power source for vehicle applications, ScienceDirect, Journal of Power Sources, Aug. 1, 2009, vol. 193.
United Kingdom Intellectual Property Office Search Report under Section 17(5) and Examination Opinion for Application No. GB1704232.6 dated Aug. 4, 2017.

\* cited by examiner

VEHICLE START-STOP SYSTEM

BACKGROUND

Automotive start-stop systems reduce fuel consumption and emissions. Start-stop systems automatically shut down a vehicle internal combustion engine under certain conditions, such as when the vehicle is temporarily stopped, to reduce the amount of time the engine spends idling. The engine is restarted in response to, e.g., the driver pressing the accelerator pedal. A starter motor is used to restart the engine.

DETAILED DESCRIPTION

Figure 1:
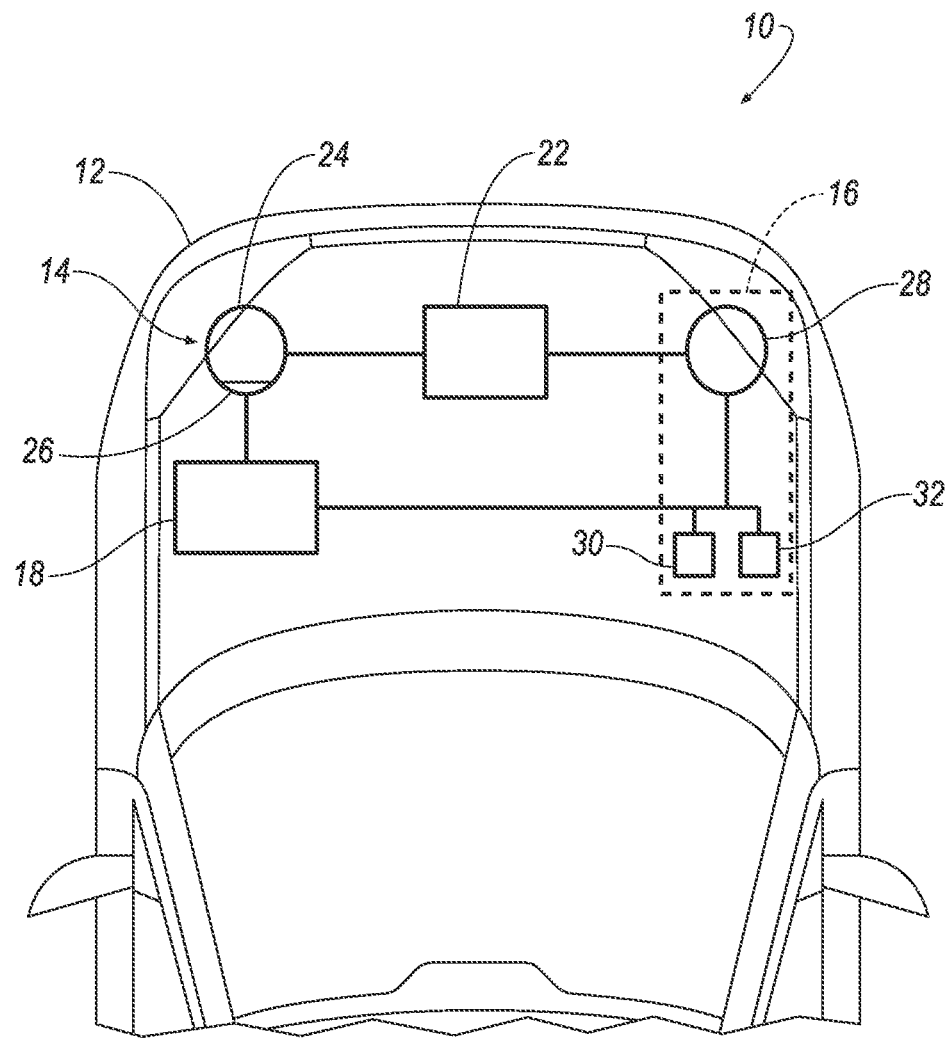
FIG. 1 illustrates an example vehicle with an assembly for charging from a low voltage power network and discharging to a starter.

Continually stopping and starting an engine during a road trip introduces new challenges for the low voltage (12-volt) vehicle electrical system. The starter motor typically draws a significant amount of energy upon starting the engine. A dedicated starter motor energy source separate from the standard automotive low voltage system may help minimize electrical fluctuations on the 12-volt power line. In other words, isolating the starter motor energy drain from the low voltage electrical system may prevent, for example, dimmed interior lighting and headlights, momentary engine idle reduction, 12-volt loads briefly turning off, etc.

Adding another energy source, e.g., 12V lead-acid battery exclusively for the starter, however, adds overhead to the vehicle electrical system in the form of added cost and burden of controlling and maintaining sufficient battery charge for repetitive restarts. A lead-acid battery is a popular choice for starting the engine in low temperatures due to its cold-cranking capability. However, lead-acid batteries are not always compatible with other energy sources. For example, a 12-volt lithium ion battery has a different voltage profile that can interfere with the lead-acid battery, especially at lower temperatures.

One way to reduce the electrical system cost while at the same time provide sufficient energy to the starter motor includes replacing the lead-acid battery with another energy storage device such as an ultracapacitor. Ultracapacitors tend to have a much higher cycle life, i.e., capable of a higher number of complete charge and discharge cycles, than that of a conventional automotive battery. An example start-stop electrical system that employs ultracapacitors includes a processor programmed to engage the ultracapacitors with the starter motor upon receiving an engine start request and disengage the ultracapacitors from the starter upon receiving an engine run command.

The ultracapacitors can charge at the 12-volt vehicle system voltage and discharge at a higher voltage, e.g., greater than 20 volts, by employing circuitry that switches banks of ultracapacitors between parallel and series configurations. The higher voltage in conjunction with current control can allow the ultracapacitors to operate at one discharge operating current when the engine is starting, which can extend the life of the starter motor. The current control capability can be used to reduce the stress on the vehicle 12-volt energy storage device by limiting the otherwise deep discharges needed to recharge the ultracapacitors. Another benefit of current control is the ability to reduce the current to zero before switching between the ultracapacitor parallel (charge) configuration and the series (discharge) configuration, thus eliminating switch arcing.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, a vehicle starter system 10 of a host vehicle 12 includes a starter 14, a low voltage power network 16, and a vehicle starter assembly 18. The vehicle starter assembly 18 includes an energy source 20 and may maintain a state of charge, i.e., a percentage of the total energy in the energy source 20, on the energy source 20 sufficient to start an engine 22, e.g., internal combustion engine, of the host vehicle 12. For example, once the vehicle starter assembly 18 detects an engine request in the form of an engine start command, the energy source 20 may be electrically disconnected from the low voltage power network 16 and connected to the starter 14 where the energy source 20 is discharged in efforts to start the engine 22. Moreover, once the vehicle starter assembly 18 detects the engine request in the form of an engine run command, the vehicle starter assembly 18 may electrically disconnect the energy source 20 from the starter 14 and reconnect it to the low voltage power network 16 where the energy source 20 may be charged. The vehicle starter assembly 18 may include any number of electrical components that, when combined, can sense an input voltage Vin and an output voltage Vout. The input voltage Vin may be defined as the voltage across the vehicle starter assembly 18 when connected to the low voltage power network 16 (see FIG. 5). The output voltage Vout may be defined as the voltage across the vehicle starter assembly 18 when connected to the starter 14 (see FIG. 6). As set forth below, a current may be controlled in the energy source 20 during charging, discharging, and when the energy source 20 is switched from either the low voltage power network 16 or the starter 14. Some or all of the components of the vehicle starter system 10, as well as the engine request, may be in communication with each other over a communication link, such as a Controller Area Network (CAN) bus, Ethernet, or the like.

The starter 14 may include any number of mechanical and electrical components that, when combined, work together to start the engine 22. For example, the starter 14 may include a starter motor 24, e.g., permanent magnet or direct-current electric motor, that mechanically engages with the engine 22. The starter 14 may include a starter solenoid 26 responsible for electrically connecting the energy source 20 to the starter motor 24 such that the starter motor 24 may rotate and potentially start the engine 22. The electrical components may sense a starter voltage, which may be defined as the voltage across the starter 14.

The low voltage power network 16 may include any number of mechanical and electrical components that, when combined, maintains a stable operating system voltage for the host vehicle 12. For example, the low voltage power network 16 may include an alternator 28, a 12-volt energy source 30, e.g., lead-acid battery, lithium ion battery, etc., and electrical loads 32, e.g., headlights, radio, lighter, etc. The alternator 28 may be mechanically coupled to the engine 22 and electrically coupled to the vehicle starter assembly 18. The combination of the alternator 28 and the 12-volt energy source 30 may charge the energy source 20 of the vehicle starter assembly 18 when the energy source 20 is connected to the low voltage power network 16. The electrical components may sense a low voltage power network voltage, which is defined as the voltage across the low voltage power network 16.

The host vehicle 12 may include any passenger or commercial automobile such as a car, a truck, a sport utility vehicle, a crossover vehicle, a van, a minivan, a taxi, a bus, hybrid electric vehicle (HEV), plug-in hybrid electric vehicle (PHEV), etc., wherever the engine 22 is present within the host vehicle 12.

Figure 2:
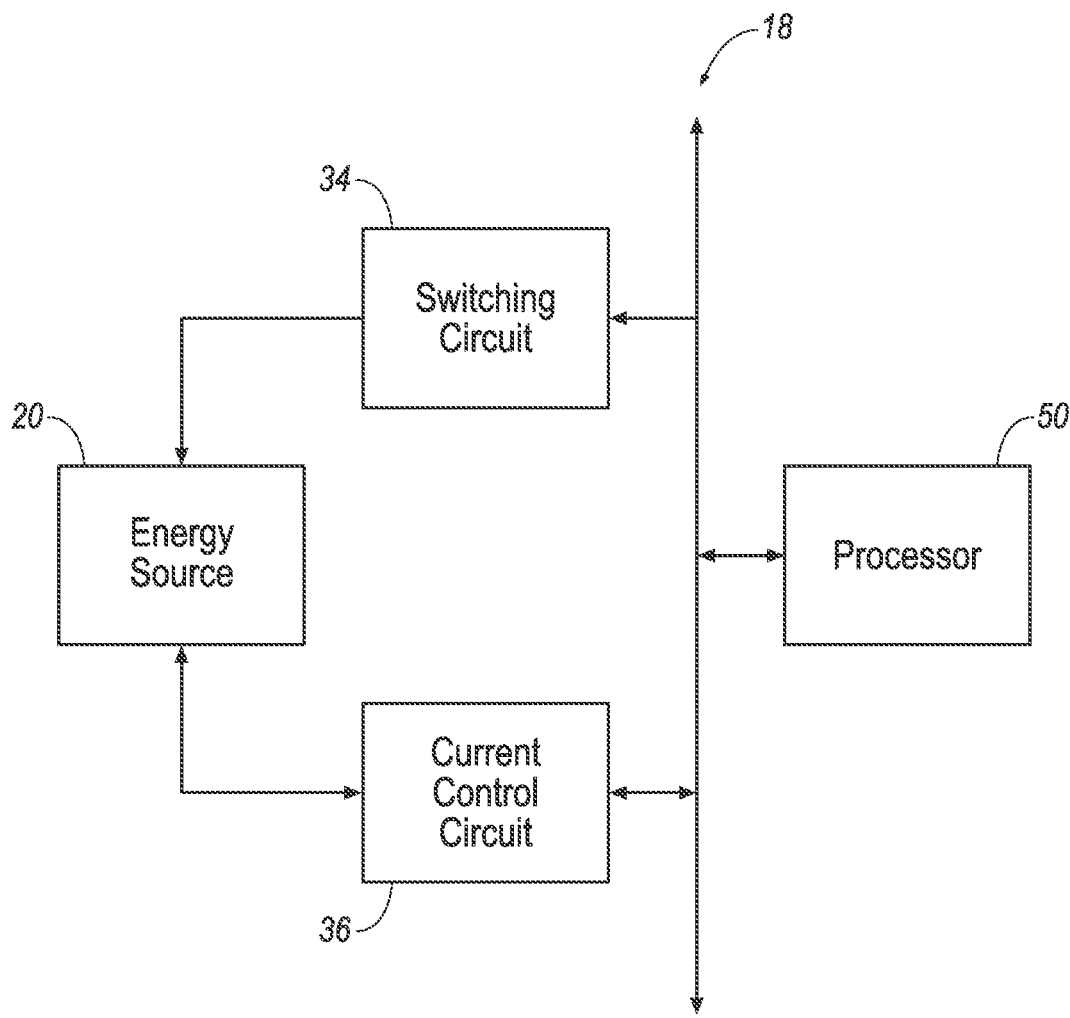
FIG. 2 is a block diagram of example components of the vehicle assembly of FIG. 1.

Referring now to FIG. 2, the vehicle starter assembly 18 includes the energy source 20, a switching circuit 34, a current control circuit 36, and a processor 50. Some or all of these components may be in communication with each other over a communication link, such as a Controller Area Network (CAN) bus, Ethernet, or the like.

The energy source 20 may include a first energy storage device 38 and a second energy storage device 40. The first energy storage device 38 and the second energy storage device 40 may be electrically connected to the switching circuit 34. The first energy storage device 38 and the second energy storage device 40 may be switched between a parallel configuration (see FIGS. 5 and 7), and a series configuration (see FIGS. 6 and 8). In the parallel configuration, the first energy storage device 38 and the second energy storage device 40 are connected to the low voltage power network 16. In the series configuration, first energy storage device 38 and the second energy storage device 40 are connected to the starter 14.

The first energy storage device 38 and the second energy storage device 40 may include any suitable energy storage device capable of being rapidly charged, e.g., fully charged in a matter of seconds, and capable of being discharged at high currents, e.g., currents of at least one hundred amps. The first energy storage device 38, the second energy storage device 40, or both, may include, for example, an ultracapacitor. The ultracapacitor configuration of at least one of the first energy storage device 38 and the second energy storage device 40 may be a stacked series string of ultracapacitors to achieve a higher voltage rating. The stacked series string of ultracapacitors may have an equivalent stacked series string connected in parallel to achieve a higher equivalent capacitance. The stacked series string of ultracapacitors may employ a voltage balancing circuit (not shown) to keep the individual ultracapacitor voltages balanced. That is, the voltage balancing circuit may monitor each ultracapacitor and adjust the voltage of a specific ultracapacitor such that its voltage is driven to within a predetermined voltage range, e.g., 50 mV, of the other ultracapacitors in the stacked series string.

The switching circuit 34 may include any suitable number of electrical switches 42 connecting the first energy storage device 38, the second energy storage device 40, the current control circuit 36, an input terminal 44 and an output terminal 46 to each other. The switching circuit 34 has a charging state as defined by the first energy storage device 38 and the second energy storage device 40 connected in parallel via the electrical switches 42. In the charging state, the electrical switches 42 also connect the first energy storage device 38 and the second energy storage device 40 to the input terminal 44 and the current control circuit 36 (see FIG. 7). The switching circuit 34 has a discharging state as defined by the first energy storage device 38 and the second energy storage device 40 connected in series via the electrical switches 42. In the discharging state, the electrical switches 42 connect the first energy storage device 38 to the current control circuit 36 and the second energy storage device 40 to the output terminal 46 (see FIG. 8). The switching circuit 34 may include electrical components that may interface with the processor 50 for toggling the electrical switches 42 between the charging state and the discharging state by a switch control signal.

The electrical switches 42 may include any number of electrical components that can be used to switch the first energy storage device 38 and the second energy storage device 40 between the charging state and the discharging state. The electrical switches 42 may include relays, e.g., single pole double throw (SPDT), triple pole triple throw (TPTT), etc. Alternatively, the electrical switches 42 may include solid-state devices, e.g., metal-oxide-semiconductor field-effect transistors (MOSFETs), insulated-gate bipolar transistors (IGBTs), etc.

Figure 7:
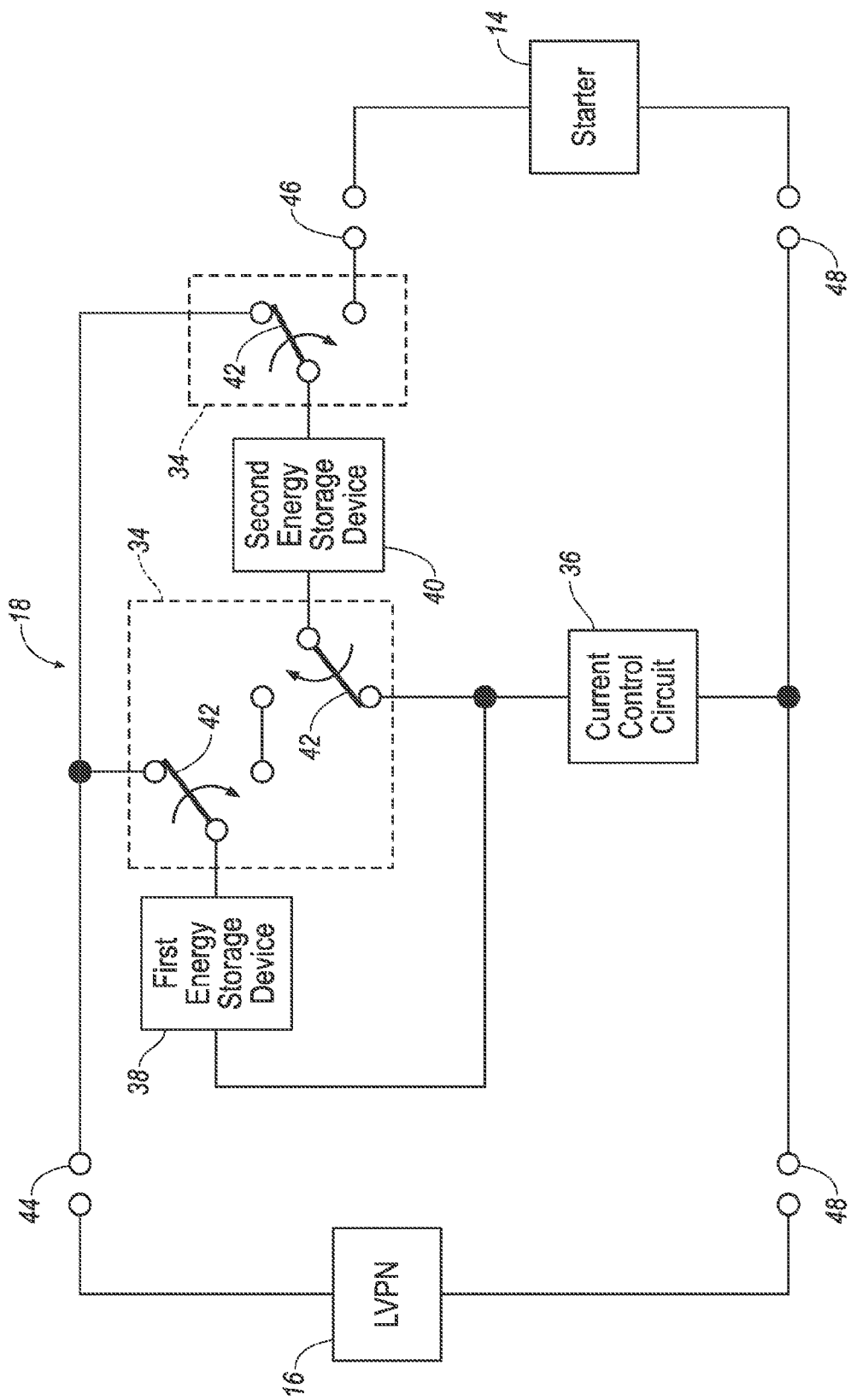
FIG. 7 is a block diagram of the example components of the vehicle assembly of FIG. 1 showing electrical switches connecting energy storage devices in the parallel configuration to the low voltage power network.
Figure 8:
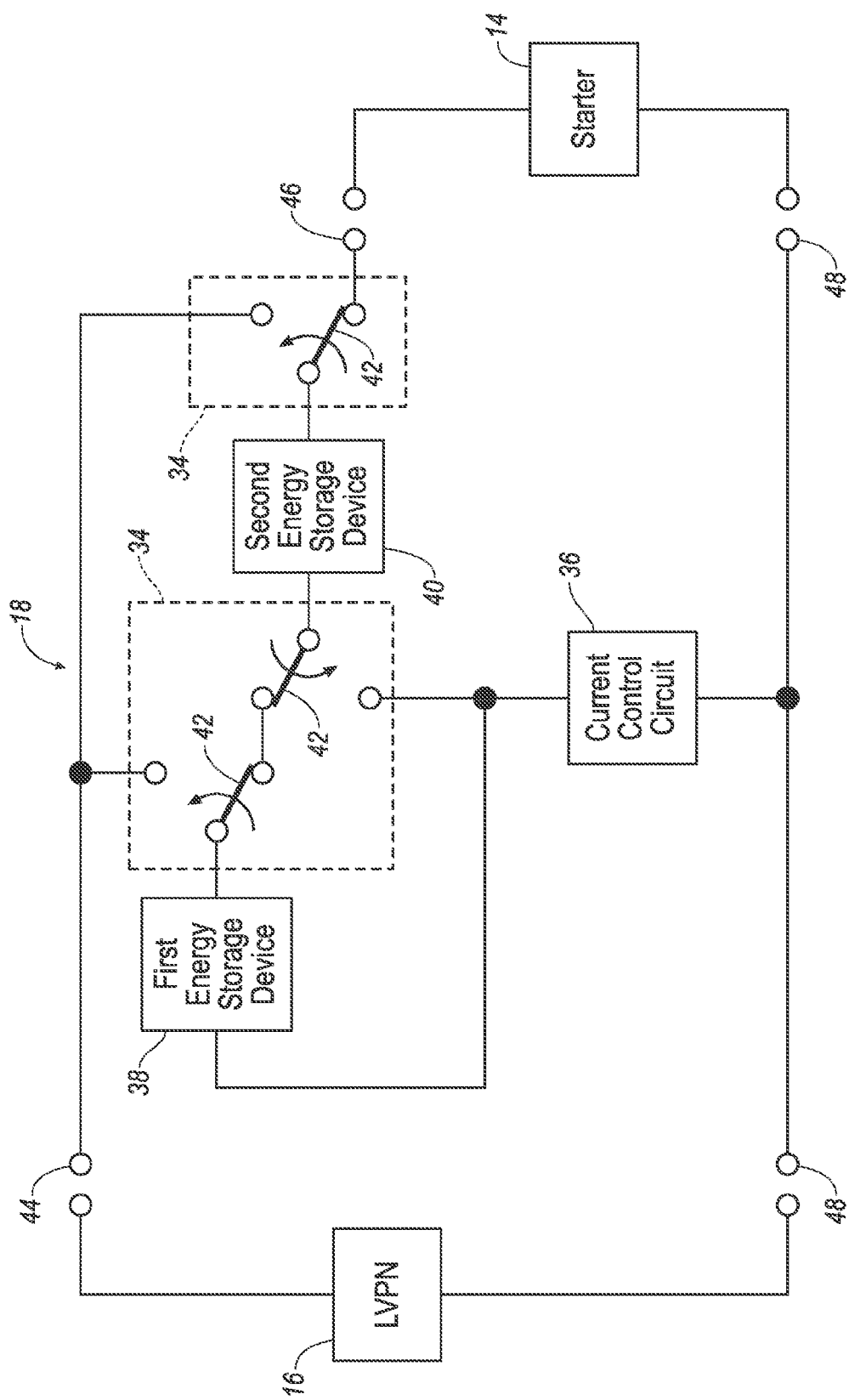
FIG. 8 is a block diagram of the example components of the vehicle assembly of FIG. 1 showing electrical switches connecting energy storage devices in the series configuration to the starter.

The vehicle starter assembly 18 may include the input terminal 44 that may electrically connect the vehicle starter assembly 18 to the low voltage power network 16 (see FIGS. 7-8). The input terminal 44 may consist of a, for example, post, connector, plug, blade connector, ring terminal, etc. The input terminal 44 may be a male or female terminal.

The vehicle starter assembly 18 may include the output terminal 46 that may electrically connect the vehicle starter assembly 18 to the starter 14 (see FIGS. 7-8). The output terminal 46 may consist of a, for example, post, connector, plug, blade connector, ring terminal, etc. The output terminal 46 may be a male or female terminal.

The vehicle starter assembly 18 may include a common terminal 48 that may electrically connect the vehicle starter assembly 18 to both the low voltage power network 16 and the starter 14 (see FIGS. 7-8). The common terminal 48 may be a return path for the input and output currents of the vehicle starter assembly 18. The common terminal 48 may consist of a, for example, post, connector, plug, blade connector, ring terminal, etc. The common terminal 48 may be a male or female terminal.

The current control circuit 36 may include any number of electrical components that may be interfaced to the processor 50 for sensing a current flow through the energy source 20, e.g., a Hall Effect sensor or a low-resistance sense resistor, etc. As set forth above, the current control circuit 36 may include any number of electrical components that may be configured to control the current flow, e.g., constant current, variable current, zero current, through the energy source 20 by a current control signal whether the switching circuit 34 is in the charging state or the discharging state. The electrical components configured for controlling the current through the energy source 20 may be, e.g., metal-oxide-semiconductor field-effect transistors (MOSFETs), insulated-gate bipolar transistors (IGBTs), etc. The current control circuit 36 may be connected between the first energy storage device 38 and the common terminal 48 (see FIGS. 7-8). The current control circuit 36 may include electrical components that may be interfaced to the processor 50 for sensing a current control circuit voltage across the current control circuit 36, i.e., voltage from a node between the first energy storage device 38 and current control circuit 36 to the common terminal 48.

The processor 50 may include any number of electrical components programmed to detect an engine request in the form of the engine start command. The engine start command may be initiated from any number of sources, e.g., ignition switch, brake pedal sensor, key fob door unlock request, driver door open switch, etc. The processor 50 may be programmed to detect any number of electrical quantities such as, for example, a magnitude of current flow through the energy source 20, the current control circuit voltage, the low voltage power network voltage and/or the input voltage Vin of the vehicle starter assembly 18 and calculate the state of charge in the energy source 20 while the switching circuit 34 is in the charging state. The processor 50 may be programmed to determine if there is enough energy in the energy source 20 sufficient to start the engine 22. In some instances, the processor 50 may be programmed to output the current control signal to maintain the current flow through the energy source 20 to charge the energy source 20. In some instances, the processor 50 may be programmed to determine if an upper state of charge is reached, indicating that the energy source 20 is sufficiently charged, and output the current control signal to stop charging, i.e., reduce the current flow to the energy source 20 to at or near zero. In other instances, the processor 50 may be programmed to reduce the current flow through the energy source 20 to a first predetermined amount before outputting the switch control signal to the switching circuit 34. The first predetermined amount may be a current small enough such that switch stresses, e.g., arcing, etc., as seen by the electrical switches 42 is significantly reduced or eliminated. The processor 50 may be programmed to output the current control signal consistent with maintaining a constant current flow while the switching circuit 34 is in the charging state.

The processor 50 may include any number of electrical components programmed to detect the engine request in the form of the engine run command. The engine run command may be initiated from any number of sources, e.g., ignition switch, powertrain control module, etc. The processor 50 may be programmed to detect any number of electrical quantities such as, for example, the magnitude of current flow through the energy source 20, the current control circuit voltage, the starter voltage and/or the output voltage Vout of the vehicle starter assembly 18 and determine the state of charge in the energy source 20 while the switching circuit 34 is in the discharging state. In some instances, the processor 50 maybe programmed to determine if a lower state of charge is reached indicating that the energy source 20 is sufficiently depleted of energy and output the current control signal to stop discharging, i.e., reduce the current flow through the energy source 20 to at or near zero. In other instances, the processor 50 may be programmed to reduce the current flow through the energy source 20 to a first predetermined amount before outputting the switch control signal to the switching circuit 34. The first predetermined amount may be a current small enough such that switch stresses, e.g., arcing, etc. as seen by the electrical switches 42 is significantly reduced or eliminated. The processor 50 may be programmed to output the current control signal consistent with maintaining a constant current flow while the switching circuit 34 is in the discharging state.

Figure 3:
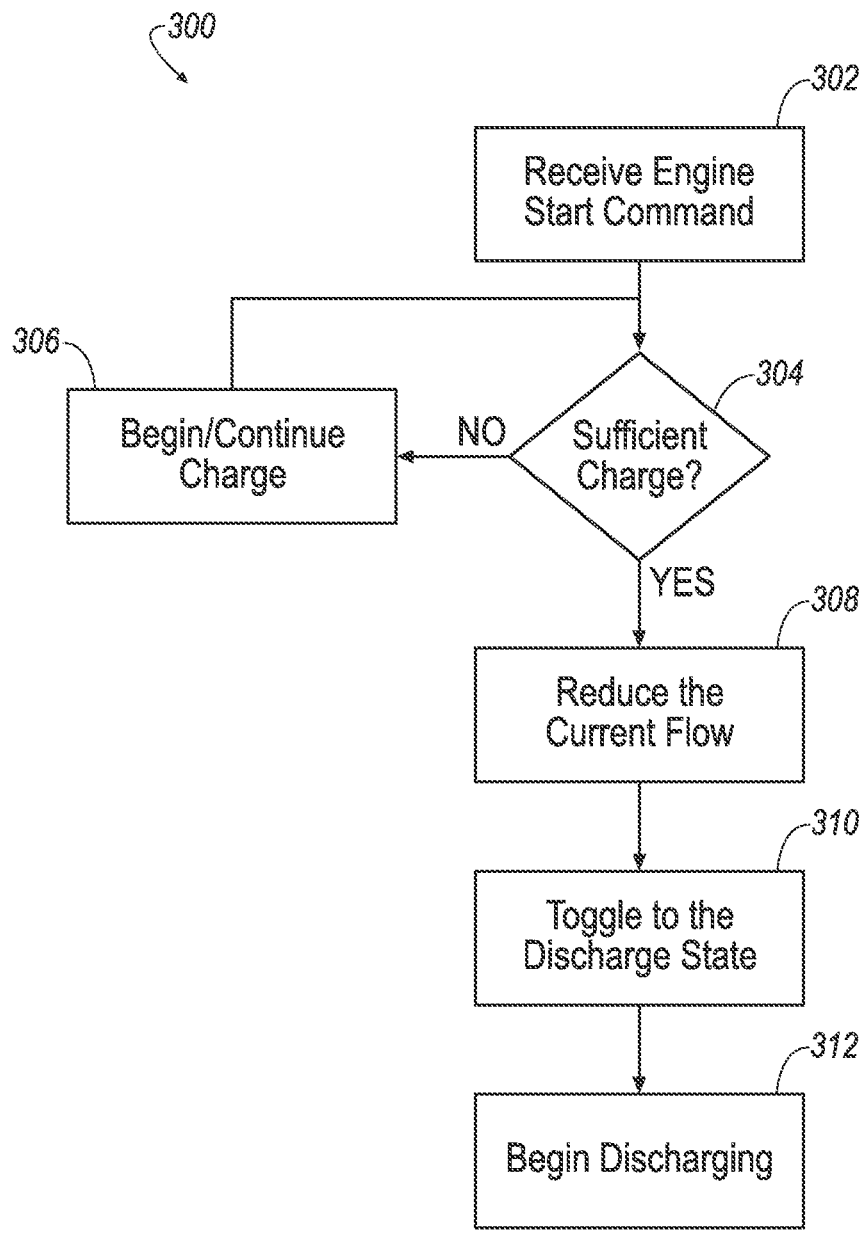
FIG. 3 is a flowchart of an example process that may be executed by the vehicle assembly.

FIG. 3 is a flowchart of an example process 300 that may be executed by the vehicle starter system 10 to configure the vehicle starter assembly 18 to toggle from the charging state to the discharging state. The process 300 may be executed at any time, such as when the vehicle starter assembly 18 receives the engine start command to start the engine 22 of the host vehicle 12. In some possible approaches, the process 300 may be executed after the host vehicle 12 has been parked overnight, and the engine start command is initiated by e.g., the key fob, the door open switch or the ignition switch. In another possible approach, the process 300 may be executed after a driver releases the brake pedal, e.g., while the host vehicle 12 was stopped at a traffic light.

At block 302, the vehicle starter assembly 18 may receive the engine start command. The engine start command may be initiated from various sources as set forth above, and received by the processor 50 via, e.g., the communication link.

At the decision block 304, the vehicle starter assembly 18 may determine whether the energy source 20 has enough state of charge to start the engine 22. For instance, the processor 50 may receive the magnitude of current flow through the energy source 20, the current control circuit voltage, the low voltage power network voltage and/or the input voltage Vin of the vehicle starter assembly 18 and determine the state of charge of the energy source 20. If the state of charge is sufficient to start the engine 22, the process 300 may proceed to block 308. Absent sufficient state of charge, the process 300 may proceed to block 306 so that the energy source 20 can charge.

At block 306, the vehicle starter assembly 18 may either begin or continue to charge the energy source 20. The processor 50 may determine a maximum charge current and output the associated current control signal to the current control circuit 36 to apply the maximum charge current to the energy source 20. The maximum charge current may be a constant charge current value. The processor 50 may monitor the current flow by receiving the magnitude of the current flow from the current control circuit 36.

At block 308, the vehicle starter assembly 18 may prepare to toggle the switching circuit 34 to the discharging state. The processor 50 may reduce the current flow through the energy source 20 to the first predetermined amount by outputting the associated current control signal to the current control circuit 36. The processor 50 may monitor the current flow by receiving the magnitude of the current flow from the current control circuit 36.

At block 310, the vehicle starter assembly 18 may toggle the switching circuit 34 from the charging state to the discharging state. Toggling the switching circuit 34 may include the processor 50 outputting the appropriate switch control signal to change the switching circuit 34 from the charging state to the discharging state. The electric switches 42 are activated and the first energy storage device 38 and the second energy storage device 40 go from the parallel configuration where it was connected to the low voltage power network 16, to the series configuration where it is connected to the starter 14.

At block 312, the vehicle starter assembly 18 is in the discharging state and the energy source 20 is discharging to the starter 14 in efforts to start the engine 22. The processor 50 may determine a maximum discharge current and output the associated current control signal to the current control circuit 36 to apply the maximum discharge current to the starter 14. The maximum discharge current may be a constant discharge current value. The processor 50 may monitor the current flow by receiving the magnitude of the current flow from the current control circuit 36.

The process 300 may continue to execute block 312 and continue to discharge the energy source 20 to the starter 14 until, for example, the processor 50 determines either that the lower state of charge of the energy source 20 is reached, or the engine 22 is commanded off via, e.g., the ignition switch, the powertrain control module, etc. In this case, the processor 50 may reduce the current flow through the energy source 20 to at or near zero by outputting the associated current control signal to the current control circuit 36. The processor 50 may monitor the current flow by receiving the magnitude of the current flow from the current control circuit 36.

Figure 4:
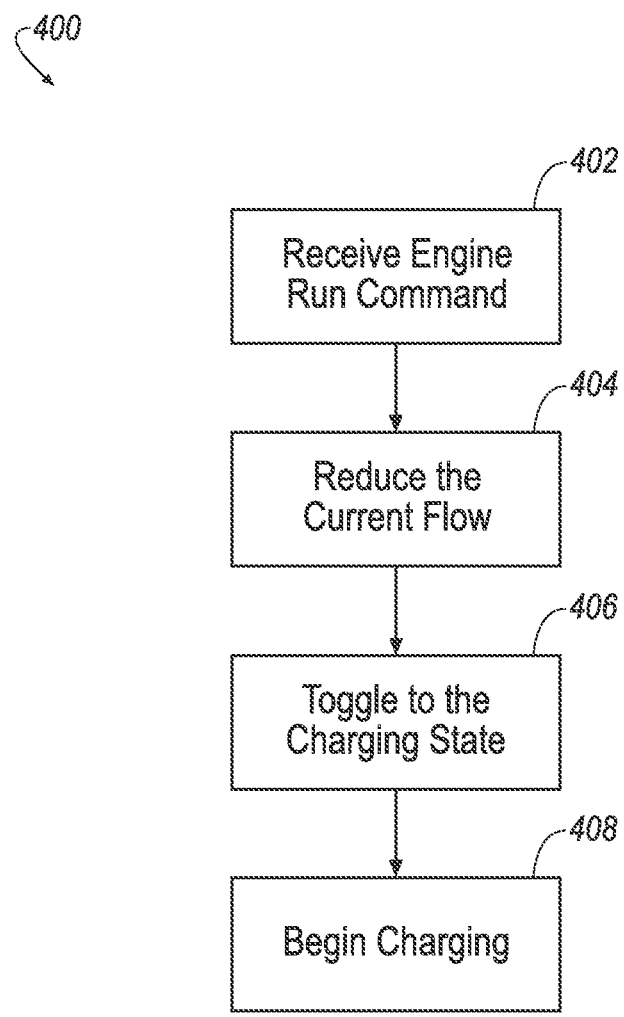
FIG. 4 is a flowchart of another example process that may be executed by the vehicle assembly.

FIG. 4 illustrates a flowchart of an example process 400 that may be executed by the vehicle starter system 10 to configure the vehicle starter assembly 18 to toggle from the discharging state to the charging state. The process 400 may be executed at any time, such as when the vehicle starter assembly 18 receives the engine run command to disengage the energy source 20 from the starter 14. In some possible approaches, the process 400 may be executed after the engine 22 has successfully started, and the engine run command has been initiated by e.g., the ignition switch, the powertrain control module, etc.

At block 402, the vehicle starter assembly 18 may receive the engine run command. The engine run command may be initiated from various sources as set forth above, and received by the processor 50 via, e.g., the communication link.

At block 404, the vehicle starter assembly 18 may prepare to toggle the switching circuit 34 to the charging state. The processor 50 may reduce the current flow through the energy source 20 to the first predetermined amount by outputting the associated current control signal to the current control circuit 36. The processor 50 may monitor the current flow by receiving the magnitude of the current flow from the current control circuit 36.

At block 406, the vehicle starter assembly 18 may toggle the switching circuit 34 from the discharging state to the charging state. Toggling the switching circuit 34 may include the processor 50 outputting the appropriate switch control signal to change the switching circuit 34 from the discharging state to the charging state. The electric switches 42 are activated and the first energy storage device 38 and the second energy storage device 40 go from the series configuration where it was connected to the starter 14, to the parallel configuration where it is connected to the low voltage power network 16.

At block 408, the vehicle starter assembly 18 is in the charging state and the energy source 20 is being charged by the low voltage power network 16. The processor 50 may determine a maximum charge current and output the associated current control signal to the current control circuit 36 to allow the maximum charge current to be applied to the energy source 20. The maximum charge current may be a constant charge current value. The processor 50 may monitor the current flow by receiving the magnitude of the current flow from the current control circuit 36.

The process 400 may continue to execute block 408 and continue to apply the charge current until, for example, the processor 50 determines either that the upper state of charge of the energy source 20 is reached, or the engine 22 is commanded off via, e.g., the ignition switch, etc. In this case, the processor 50 may reduce the current flow through the energy source 20 to at or near zero by outputting the associated current control signal to the current control circuit 36. The processor 50 may monitor the current flow by receiving the magnitude of the current flow from the current control circuit 36.

Figure 5:
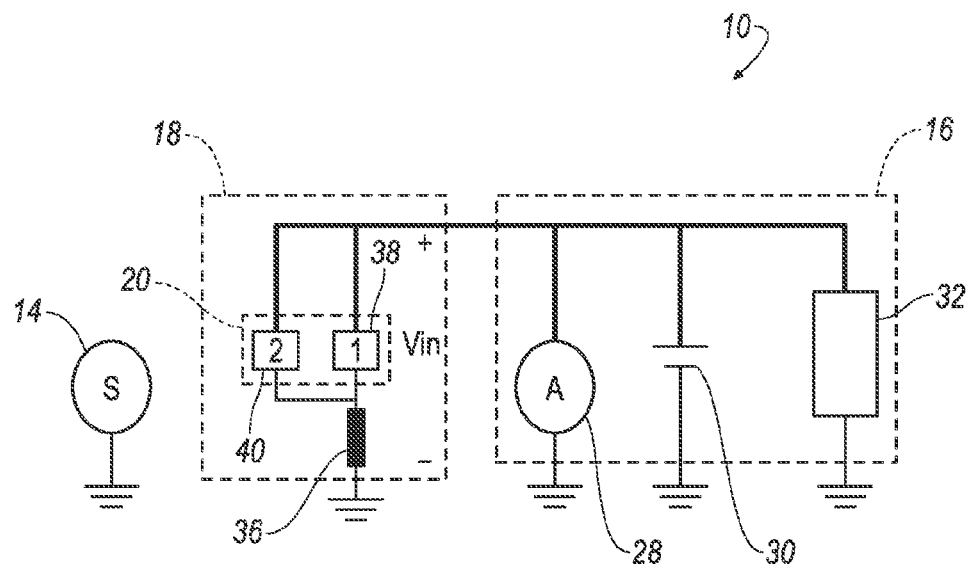
FIG. 5 is an electrical schematic of example components of the vehicle assembly of FIG. 1 showing energy storage devices in a parallel configuration.

Referring now to FIG. 5, the vehicle starter assembly 18 is shown schematically in the charging state where the first energy storage device 38 and the second energy storage device 40 are in the parallel configuration. The first energy storage device 38 and the second energy storage device 40 are disengaged from the starter 14, and connected to the low voltage power network 16 and the current control circuit 36.

Figure 6:
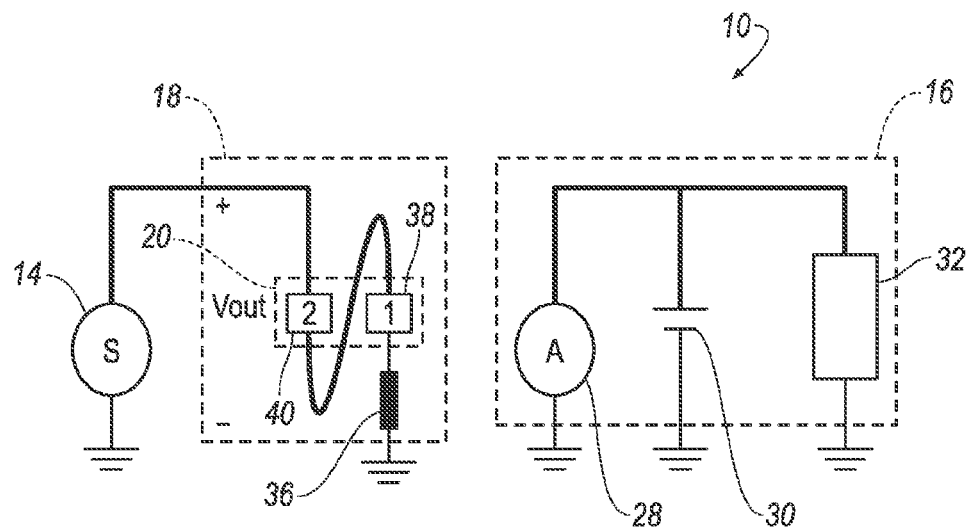
FIG. 6 is an electrical schematic of example components of the vehicle assembly of FIG. 1 showing energy storage devices in a series configuration.

Referring to FIG. 6, the vehicle starter assembly 18 is shown schematically in the discharging state where the first energy storage device 38 and the second energy storage device 40 are in the series configuration. The first energy storage device 38 and the second energy storage device 40 are disengaged from the low voltage power network 16. The first energy storage device 38 is connected to the current control circuit 36, and the second energy storage device 40 is connected to the starter 14.

FIGS. 7 and 8 illustrate the switching circuit 34 electrical switch positions for both the parallel configuration and the series configuration. As shown in FIG. 7, the electrical switches 42, e.g., triple pole triple throw (TPTT) relay, connect the first energy storage device 38 and the second energy storage device 40 together in the parallel configuration. The electrical switches 42 also connect the first energy storage device 38 and the second energy storage device 40 to the low voltage power network 16 and the current control circuit 36. As shown in FIG. 8, the electrical switches 42, e.g., triple pole triple throw (TPTT) relay, connect the first energy storage device 38 and the second energy storage device 40 together in the series configuration. The electrical switches 42 also connect the first energy storage device 38 to the current control circuit 36, and the second energy storage device 40 to the starter 14. FIGS. 7 and 8 also show the input terminal 44, the output terminal 46 and the common terminal 48 of the vehicle starter assembly 18.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A vehicle starter assembly comprising:
    a switching circuit configured to operate in a charging state and a discharging state;
    a first energy storage device and a second energy storage device electrically connected to the switching circuit, wherein the first energy storage device and the second energy storage device are connected in parallel to one another in the charging state and in series with one another in the discharging state;
    a current control circuit electrically connected to the first energy storage device; and
    a processor programmed to detect an engine request and output a switch control signal that toggles the switching circuit between the charging state and the discharging state, wherein the processor is programmed to output a current control signal to the current control circuit and wherein the current control circuit is programmed to maintain a constant magnitude of current flow through the first energy storage device and the second energy storage device in accordance with the current control signal.

2. The vehicle starter assembly of claim 1, further comprising an input terminal electrically connected to the first energy storage device and the second energy storage device via the switching circuit when in the charging state.

3. The vehicle starter assembly of claim 2, further comprising an output terminal electrically connected to the second energy storage device via the switching circuit when in the discharging state.

4. The vehicle starter assembly of claim 1, wherein the current control circuit is configured to control a current flow through the first energy storage device and the second energy storage device when the switching circuit is in the charging state and in accordance with the current control signal.

5. The vehicle starter assembly of claim 4, wherein the current control circuit is configured to control the current flow through the first energy storage device and the second energy storage device when the switching circuit is in the discharging state and in accordance with the current control signal.

6. The vehicle starter assembly of claim 5, wherein the processor is programmed to detect the magnitude of the current flow and output the current control signal based at least in part on the magnitude of the current flow and the switching circuit operating in one of the charging state and the discharging state.

7. The vehicle starter assembly of claim 1, wherein the processor is programmed to output the current control signal to reduce the current flow through the first energy storage device and the second energy storage device to a first predetermined amount before outputting the switch control signal to the switching circuit.

8. The vehicle starter assembly of claim 1, wherein at least one of the first energy storage device and the second energy storage device includes an ultracapacitor.

9. The vehicle starter assembly of claim 1, wherein the energy request includes an engine start command and an engine run command.

10. A vehicle starter system comprising:
a low voltage power network;
a starter;
a switching circuit configured to operate in a charging state and a discharging state;
a first energy storage device and a second energy storage device electrically connected to the switching circuit, wherein the first energy storage device and the second energy storage device are connected in parallel to one another in the charging state and in series with one another in the discharging state;
an input terminal electrically connected to the low voltage power network, wherein the input terminal electrically connects the first energy storage device and the second energy storage device to the low voltage power network when the switching circuit is in the charging state;
an output terminal electrically connected to the starter, wherein the output terminal electrically connects the second energy storage device to the output terminal when the switching circuit is in the discharging state;
a current control circuit electrically connected to the first energy storage device; and
a processor programmed to detect an engine request and output a switch control signal that toggles the switching circuit between the charging state and the discharging state and wherein the processor is programmed to output a current control signal to the current control circuit, and
wherein the current control circuit is configured to maintain a constant magnitude of current flow through the first energy storage device and the second energy storage device when the switching circuit is in the charging state in accordance with the current control signal.

11. The vehicle starter system of claim 1, wherein the current control circuit is configured to control the current flow through the first energy storage device and the second energy storage device when the switching circuit is in the discharging state and in accordance with the current control signal.

12. The vehicle starter system of claim 11, wherein the processor is programmed to detect the magnitude of the current flow and output the current control signal based at least in part on the magnitude of the current flow and the switching circuit operating in one of the charging state and the discharging state.

13. The vehicle starter system of claim 10, wherein the processor is programmed to output the current control signal to maintain the constant magnitude of the current flow through the first energy storage device and the second energy storage device.

14. The vehicle starter system of claim 10, wherein the processor is programmed to output the current control signal to reduce the magnitude of the current flow through the first energy storage device and the second energy storage device to a first predetermined amount before outputting the switch control signal to the switching circuit.

15. The vehicle starter system of claim 10, wherein at least one of the first energy storage device and the second energy storage device includes an ultracapacitor.

16. The vehicle starter system of claim 10, wherein the energy request includes an engine start command and an engine run command.

* * * * *